(12) United States Patent
Naohara et al.

(10) Patent No.: US 11,294,537 B2
(45) Date of Patent: Apr. 5, 2022

(54) DATA PROCESSING METHOD, DATA PROCESSING DEVICE, AND COMPUTER-READABLE RECORDING MEDIUM HAVING RECORDED THEREON DATA PROCESSING PROGRAM

(71) Applicant: SCREEN Holdings Co., Ltd., Kyoto (JP)

(72) Inventors: Hideji Naohara, Kyoto (JP); Yumiko Hirato, Kyoto (JP)

(73) Assignee: SCREEN Holdings Co., Ltd.

(*) Notice: Subject to any disclaimer, the term of this patent is extended or adjusted under 35 U.S.C. 154(b) by 65 days.

(21) Appl. No.: 16/261,650

(22) Filed: Jan. 30, 2019

(65) Prior Publication Data

US 2019/0243593 A1 Aug. 8, 2019

(30) Foreign Application Priority Data

Feb. 8, 2018 (JP) .............................. JP2018-020795

(51) Int. Cl.
*G06F 3/0482* (2013.01)
*G06F 3/0484* (2013.01)
*G06F 3/14* (2006.01)
*G06T 11/20* (2006.01)

(52) U.S. Cl.
CPC ........ *G06F 3/0482* (2013.01); *G06F 3/04847* (2013.01); *G06F 3/14* (2013.01); *G06T 11/206* (2013.01)

(58) Field of Classification Search
None
See application file for complete search history.

(56) References Cited

U.S. PATENT DOCUMENTS

| 5,841,893 | A | * | 11/1998 | Ishikawa | G01N 21/956 382/145 |
|---|---|---|---|---|---|
| 6,542,830 | B1 | * | 4/2003 | Mizuno | G01R 31/2894 257/E21.525 |
| 6,611,728 | B1 | * | 8/2003 | Morioka | G01N 21/9501 257/E21.525 |
| 9,330,174 | B1 | * | 5/2016 | Zhang | G06F 16/95 |
| 9,786,027 | B1 | | 10/2017 | Cooley et al. | |
| 10,061,824 | B2 | * | 8/2018 | Robichaud | G06F 3/0484 |

(Continued)

FOREIGN PATENT DOCUMENTS

| JP | H03-62101 A | 3/1991 |
|---|---|---|
| JP | 2001-265431 A | 9/2001 |

(Continued)

*Primary Examiner* — Linda Huynh
(74) *Attorney, Agent, or Firm* — Ostrolenk Faber LLP

(57) ABSTRACT

In order to process time series data obtained in a substrate processing apparatus having a plurality of processing units, a data processing method includes an evaluation value calculation step of obtaining a score of the time series data by comparing the time series data with reference data, and a result display step of displaying an evaluation result screen including, for each processing unit, a number of score errors being a number of substrates of which score is abnormal, and a pie chart showing a ratio of the number of score errors to a number of processed substrates. A display size of the number of score errors and that of the pie chart change depending on the number of score errors.

14 Claims, 11 Drawing Sheets

(56) References Cited

U.S. PATENT DOCUMENTS

| | | | | |
|---|---|---|---|---|
| 2001/0001015 | A1* | 5/2001 | Ishikawa | H01L 22/20 382/149 |
| 2004/0044484 | A1* | 3/2004 | Obara | H01L 21/67253 702/35 |
| 2006/0074866 | A1* | 4/2006 | Chamberlain | G06F 40/18 |
| 2006/0229896 | A1* | 10/2006 | Rosen | G06Q 10/1053 705/321 |
| 2008/0204405 | A1* | 8/2008 | Koike | G03F 7/70625 345/156 |
| 2009/0292387 | A1* | 11/2009 | Funakoshi | G06F 3/0481 700/110 |
| 2010/0188417 | A1* | 7/2010 | Kojitani | H05K 13/083 345/593 |
| 2010/0228725 | A1 | 9/2010 | Ohashi et al. | 707/722 |
| 2012/0053868 | A1 | 3/2012 | Matsumoto | 702/61 |
| 2013/0318236 | A1* | 11/2013 | Coates | H04L 41/22 709/224 |
| 2017/0116319 | A1 | 4/2017 | Zhou | |
| 2018/0224836 | A1* | 8/2018 | Oka | G06Q 10/0637 |
| 2020/0184692 | A1* | 6/2020 | Yang | G06T 11/206 |

FOREIGN PATENT DOCUMENTS

| | | | |
|---|---|---|---|
| JP | 2004-226175 A | 8/2004 | |
| JP | 2010-211377 A | 9/2010 | |
| KR | 10-2014-0012144 A | 1/2014 | |
| TW | 201723705 A | 7/2017 | |
| WO | WO 03/085504 A2 | 10/2003 | |
| WO | WO 2012/129249 A2 | 9/2012 | |
| WO | WO-2019003524 A1 * | 1/2019 | G05B 19/418 |

\* cited by examiner

Fig. 11

Score Error List — 71

| ID | Status | Date & Time | Error Contents |
|---|---|---|---|
| ⋮ | ⋮ | ⋮ | ⋮ |
| E03403 | ✓ | 01/22/2018 12:25:15 | Chamber16 Score Error |
| E03404 | ✓ | 01/22/2018 12:29:30 | Chamber3 Score Error |
| E03505 | ☒ | 01/22/2018 12:33:00 | Chamber15 Score Error |
| E03506 | ☐ | 01/22/2018 12:41:15 | Chamber9 Score Error |
| ⋮ | ⋮ | ⋮ | ⋮ |

[ OK ] [ Cancel ]

Recipe List — 75

| ID | Select | Last Update | Recipe Contents |
|---|---|---|---|
| ⋮ | ⋮ | ⋮ | ⋮ |
| R0011 | ☐ | 12/02/2016 10:16:15 | Process with material M1 |
| R0023 | ☐ | 03/08/2017 16:02:30 | Process at temperature T4 |
| R0026 | ☒ | 01/09/2018 09:16:00 | Process with material M3 |
| R0035 | ☐ | 08/01/2017 13:23:45 | Process at pressure P6 |
| ⋮ | ⋮ | ⋮ | ⋮ |

[ OK ] [ Cancel ]

Result List — 81

Chamber15

| Substrate | Recipe | Error/Total | Start Time/End Time |
|---|---|---|---|
| ⋮ | ⋮ | ⋮ | ⋮ |
| S214065 | R0026 | 3/ 240 | 01/22/2018 12:08:15 -> 12:19:30 |
| S214066 | R0026 | 0/ 240 | 01/22/2018 12:20:30 -> 12:28:45 |
| S214067 | R0026 | 14/ 240 | 01/22/2018 12:29:00 -> 12:40:30 |
| ⋮ | ⋮ | ⋮ | ⋮ |

[ OK ] [ Cancel ]

Score List — 82

Chamber15  S214067  R0026  14/240
01/22/2017 12:29:00 -> 12:40:30

| Data | Ref. Data | Condition | Result | Score |
|---|---|---|---|---|
| ⋮ | ⋮ | ⋮ | ⋮ | ⋮ |
| D0145 | RD0006 | Thresholed 0.1 | OK | 0.013 |
| D0146 | RD0006 | Thresholed 0.1 | NG | 0.194 |
| D0147 | RD0005 | Thresholed 0.2 | OK | 0.107 |
| ⋮ | ⋮ | ⋮ | ⋮ | ⋮ |

[ OK ] [ Cancel ]

69

DATA PROCESSING METHOD, DATA PROCESSING DEVICE, AND COMPUTER-READABLE RECORDING MEDIUM HAVING RECORDED THEREON DATA PROCESSING PROGRAM

BACKGROUND OF THE INVENTION

Field of the Invention

The present invention relates to digital data processing, especially to a processing method, a processing device, and a processing program of data measured in a substrate processing apparatus.

Description of Related Art

As a method for detecting an abnormality in a device or an apparatus, there is known a method in which physical quantities (for example, length, angle, time, speed, force, pressure, voltage, current, temperature, flow) showing operating status of the device or the apparatus are measured using sensors or the like, and time series data obtained by arranging measurement results in a time-series order is analyzed. When the device or the apparatus performs a same operation under a same condition, the time series data changes similarly if there are no abnormalities. Therefore, it is possible to detect abnormal time series data by mutually comparing a plurality of pieces of time series data which is expected to change similarly and specify an occurring position and a cause of the abnormality by analyzing the abnormal time series data.

In a manufacturing process of a semiconductor substrate (hereinafter referred to as a substrate), a series of processing is performed using a plurality of substrate processing apparatuses. The substrate processing apparatus includes a plurality of processing units for performing, on the substrate, specific processing in the series of processing. Each processing unit performs the processing on the substrate in accordance with a predetermined procedure (called a recipe). At this time, time series data is obtained based on measurement results in each processing unit. It is possible to specify the processing unit in which the abnormality occurs and the cause of the abnormality by analyzing the obtained time series data.

Related to the invention of the present application, Japanese Laid-Open Patent Publication No. 2001-265431 discloses an error output method in which error information on errors which occur independently is displayed in a first layer and error information on errors which occur due to preceding errors is displayed in a lower layer area including second and lower layers. International Publication No. 2003/85504 discloses a graphical user interface for semiconductor system process including a screen for displaying various kinds of information.

The substrate processing apparatus has a plurality of processing units, and a lot of time series data is obtained based on a lot of measurement results in each processing unit. Thus, when a user (operator of substrate processing apparatus) looks at a display screen including all abnormalities of the time series data, the user cannot grasp status of the substrate processing apparatus easily.

SUMMARY OF THE INVENTION

Therefore, an object of the present invention is to provide a data processing method by which status of a substrate processing apparatus can be grasped easily.

According to a first aspect of the present invention, there is provided a data processing method for processing time series data obtained in a substrate processing apparatus having a plurality of processing units, the method including: an evaluation value calculation step of obtaining an evaluation value of the time series data by comparing the time series data with reference data; and a result display step of displaying an evaluation result screen including, for each processing unit, a pie chart showing a ratio of a number of abnormalities to a number of processed substrates, the number of abnormalities being a number of substrates of which evaluation value is abnormal, wherein a display size of the pie chart changes depending on the number of abnormalities.

According to a second aspect of the present invention, in the first aspect of the present invention, the evaluation result screen includes the number of abnormalities inside the pie chart.

According to a third aspect of the present invention, in the second aspect of the present invention, a display size of the number of abnormalities changes depending on the number of abnormalities.

According to a fourth aspect of the present invention, in the first aspect of the present invention, the evaluation result screen further includes, for each processing unit, an arrow showing a trend of increase and decrease of the number of abnormalities.

According to a fifth aspect of the present invention, in the first aspect of the present invention, the evaluation result screen further includes a face mark, and an expression of the face mark changes depending on a number of substrates of which evaluation value is abnormal and on which processing is completed after a confirmation by a user.

According to a sixth aspect of the present invention, in the first aspect of the present invention, the data processing method further includes an evaluation value selection step of selecting an evaluation value with respect to a substrate satisfying a given condition from evaluation values obtained in the evaluation value calculation step, and in the result display step, the evaluation result screen is displayed based on the evaluation value selected in the evaluation value selection step.

According to a seventh aspect of the present invention, in the sixth aspect of the present invention, in the evaluation value selection step, the evaluation value with respect to the substrate on which different processing is performed for each group of the processing units is selected, and in the result display step, the evaluation result screen is displayed based on the evaluation value with respect to the substrate on which different processing is performed for each group of the processing units.

According to an eighth aspect of the present invention, in the first aspect of the present invention, in the result display step, the evaluation result screen, a screen including the evaluation value, and a screen including a graph of the time series data are displayed hierarchically.

According to a ninth aspect of the present invention, in the first aspect of the present invention, in the result display step, a summary screen based on the evaluation value obtained in the evaluation value calculation step and an evaluation value obtained in another data processing device is displayed.

According to a tenth aspect of the present invention, in the first aspect of the present invention, the reference data is another time series data.

According to an eleventh aspect of the present invention, there is provided a data processing device for processing time series data obtained in a substrate processing apparatus having a plurality of processing units, the device including: an evaluation value calculation section configured to obtain an evaluation value of the time series data by comparing the time series data with reference data; and a result display section configured to display an evaluation result screen including, for each processing unit, a pie chart showing a ratio of a number of abnormalities to a number of processed substrates, the number of abnormalities being a number of substrates of which evaluation value is abnormal, wherein a display size of the pie chart changes depending on the number of abnormalities.

According to a twelfth aspect of the present invention, in the eleventh aspect of the present invention, the evaluation result screen includes the number of abnormalities inside the pie chart.

According to a thirteenth aspect of the present invention, in the twelfth aspect of the present invention, a display size of the number of abnormalities changes depending on the number of abnormalities.

According to a fourteenth aspect of the present invention, in the eleventh aspect of the present invention, the evaluation result screen further includes, for each processing unit, an arrow showing a trend of increase and decrease of the number of abnormalities.

According to a fifteenth aspect of the present invention, in the eleventh aspect of the present invention, the evaluation result screen further includes a face mark, and an expression of the face mark changes depending on a number of substrates of which evaluation value is abnormal and on which processing is completed after a confirmation by a user.

According to a sixteenth aspect of the present invention, in the eleventh aspect of the present invention, the data processing device further includes an evaluation value selection section configured to select an evaluation value with respect to a substrate satisfying a given condition from evaluation values obtained by the evaluation value calculation section, and the result display section displays the evaluation result screen based on the evaluation value selected by the evaluation value selection section.

According to a seventeenth aspect of the present invention, in the sixteenth aspect of the present invention, the evaluation value selection section selects the evaluation value with respect to the substrate on which different processing is performed for each group of the processing units, and the result display section displays the evaluation result screen based on the evaluation value with respect to the substrate on which different processing is performed for each group of the processing units.

According to an eighteenth aspect of the present invention, in the eleventh aspect of the present invention, the result display section hierarchically displays the evaluation result screen, a screen including the evaluation value, and a screen including a graph of the time series data.

According to a nineteenth aspect of the present invention, in the eleventh aspect of the present invention, the result display section displays a summary screen based on the evaluation value obtained by the evaluation value calculation section and an evaluation value obtained in another data processing device.

According to a twentieth aspect of the present invention, there is provided a computer-readable recording medium having recorded thereon a data processing program for processing time series data obtained in a substrate processing apparatus including a plurality of processing units, the data processing program causing a computer to execute a method by a CPU using a memory, the method including: an evaluation value calculation step of obtaining an evaluation value of the time series data by comparing the time series data with reference data; and a result display step of displaying an evaluation result screen including, for each processing unit, a pie chart showing a ratio of a number of abnormalities to a number of processed substrates, the number of abnormalities being a number of substrates of which evaluation value is abnormal, wherein a display size of the pie chart changes depending on the number of abnormalities.

According to the first, eleventh, or twentieth aspect, the evaluation result screen including, for each processing unit, the pie chart showing the ratio of the number of abnormalities (number of substrates of which evaluation value is abnormal) is displayed, and the display size of the pie chart changes depending on the number of abnormalities. Therefore, when a user looks at the evaluation result screen, the user can easily recognize the ratio of the substrates of which evaluation value is abnormal. Furthermore, based on the displayed pie chart, it is possible to easily grasp status of the plurality of processing units included in the substrate processing apparatus and easily recognize the processing unit having high urgency in the plurality of processing units.

According to the second or twelfth aspect, the status of the plurality of processing units can be displayed in a small area by displaying the number of abnormalities inside the pie chart.

According to the third or thirteenth aspect, the display size of the number of abnormalities changes depending on the number of abnormalities. Therefore, when the user looks at the evaluation result screen, based on the displayed number of abnormalities, the user can easily grasp the status of the plurality of processing units included in the substrate processing apparatus and can easily recognize the processing unit having high urgency in the plurality of processing units.

According to the fourth or fourteenth aspect, the user can easily recognize the trend of increase and decrease of the number of abnormalities in each processing unit, by looking at the arrow.

According to the fifth or fifteenth aspect, the user can easily recognize a degree to which the substrates of which evaluation value is abnormal are detected recently, by looking at the face mark.

According to the sixth or sixteenth aspect, the evaluation result screen based on the evaluation value with respect to the substrate satisfying the given condition is displayed. Therefore, the user can easily recognize the status of the processing units when the substrate is processed in accordance with a specific procedure.

According to the seventh or seventeenth aspect, the evaluation result screen based on the evaluation value with respect to the substrate on which different processing is performed for each group of the processing units is displayed. Therefore, the user can easily recognize the status of the processing units when different processing is performed on the substrates for each group.

According to the eighth or eighteenth aspect, the user can easily analyze the evaluation value and the time series data with respect to the substrate of which evaluation value is abnormal, by hierarchically displaying the evaluation result screen, the screen including the evaluation value, and the screen including the graph of the time series data.

According to the ninth or nineteenth aspect, when the user looks at the summary screen, the user can easily grasp status of a plurality of substrate processing apparatuses.

According to the tenth aspect, an evaluation value suitable for the time series data can be obtained by using the other time series data as the reference data.

These and other objects, features, modes and effects of the present invention will be more apparent from the following detailed description with reference to the attached drawings.

BRIEF DESCRIPTION OF THE DRAWINGS

FIG. 11 is a diagram showing a score error list screen of the data processing device shown in FIG. 1.

FIG. 12 is a diagram showing a recipe list screen of the data processing device shown in FIG. 1.

FIG. 13A is a diagram showing a result list screen of the data processing device shown in FIG. 1.

FIG. 13B is a diagram showing a score list screen of the data processing device shown in FIG. 1.

DETAILED DESCRIPTION OF THE INVENTION

In the following, a data processing method, a data processing device, and a data processing program according to an embodiment of the present invention are described with reference to the drawings. The data processing method according to the present embodiment is typically performed using a computer. The data processing program according to the present embodiment is a program for performing the data processing method using a computer. The data processing device according to the present embodiment is typically configured using a computer. The computer executing the data processing program functions as the data processing device.

Figure 1:
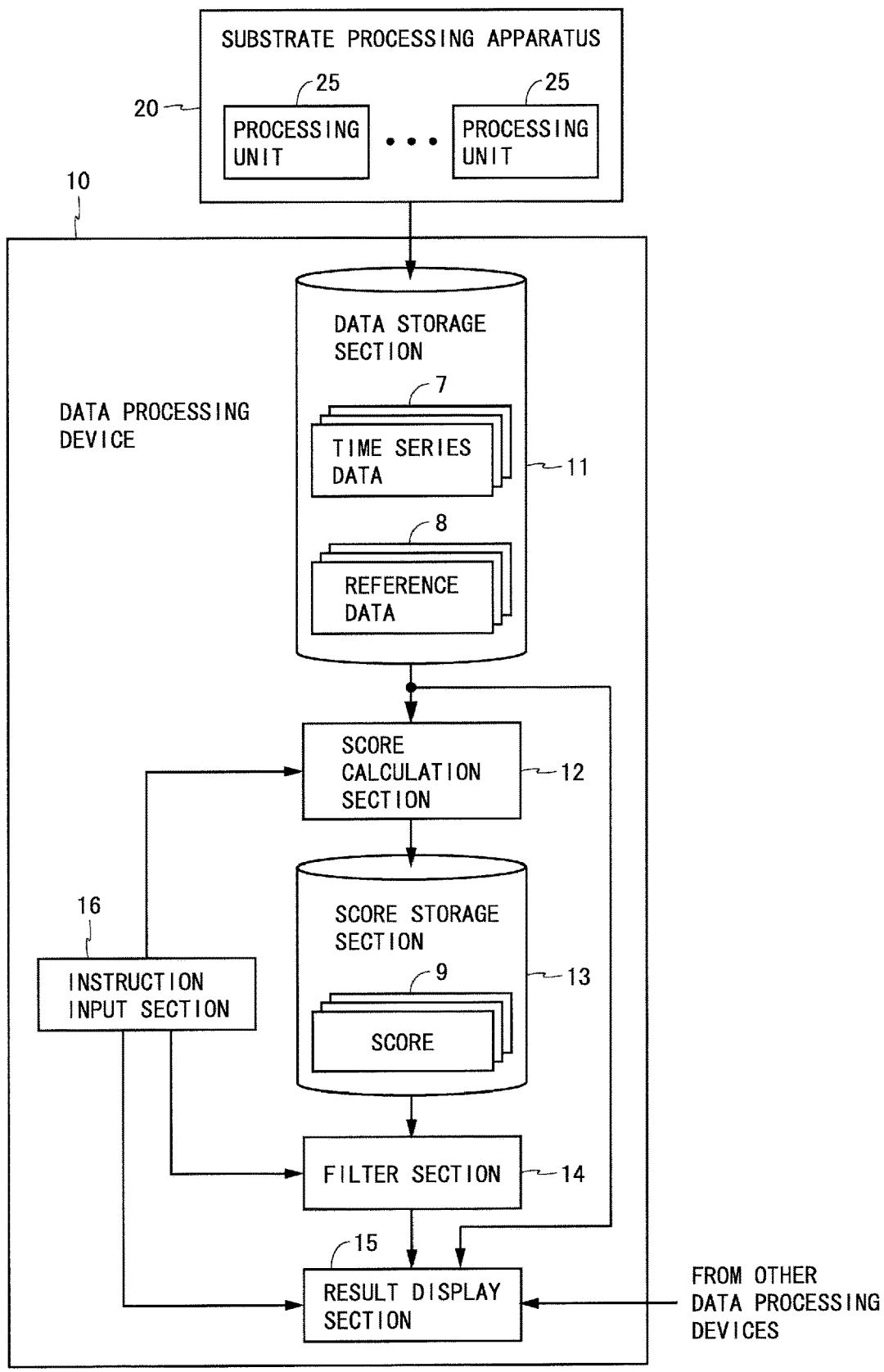
FIG. 1 is a block diagram showing a configuration of a data processing device according to an embodiment of the present invention.

FIG. 1 is a block diagram showing a configuration of a data processing device according to an embodiment of the present invention. A data processing device 10 shown in FIG. 1 includes a data storage section 11, a score calculation section 12, a score storage section 13, a filter section 14, a result display section 15, and an instruction input section 16. The data processing device 10 is used being connected to a substrate processing apparatus 20.

The substrate processing apparatus 20 includes a plurality of processing units 25, and a plurality of physical quantities (for example, length, angle, time, speed, force, pressure, voltage, current, temperature, flow) showing operating status of the processing unit 25 is measured in each processing unit 25. With this, a plurality of pieces of time series data 7 is obtained. The data storage section stores the time series data 7 obtained by the above-described method and reference data 8 which is expected value data of the time series data 7. For example, another time series data determined as optimal for the expected value data in a lot of time series data is used as the reference data 8.

The score calculation section 12 obtains an evaluation value (hereinafter referred to as a score) with respect to the time series data 7 stored in the data storage section 11. The score calculation section 12 reads the time series data 7 and corresponding reference data 8 from the data storage section 11, and compares both to obtain a score 9. The score storage section 13 stores the score 9 obtained by the score calculation section 12. The filter section 14 selects the score 9 with respect to the substrate satisfying a given condition from the scores 9 stored in the score storage section 13. The score calculation section 12 functions as an evaluation value calculation section, and the filter section 14 functions as an evaluation value selection section.

The result display section 15 displays an evaluation result screen including, for each processing unit 25, a number of substrates of which score 9 is abnormal. An instruction from a user is input to the instruction input section 16. Using the instruction input section 16, the user instructs a score calculation method in the score calculation section 12, a filtering method in the filter section 14, a selection of a screen displayed in the result display section 15, and the like.

Figure 2:
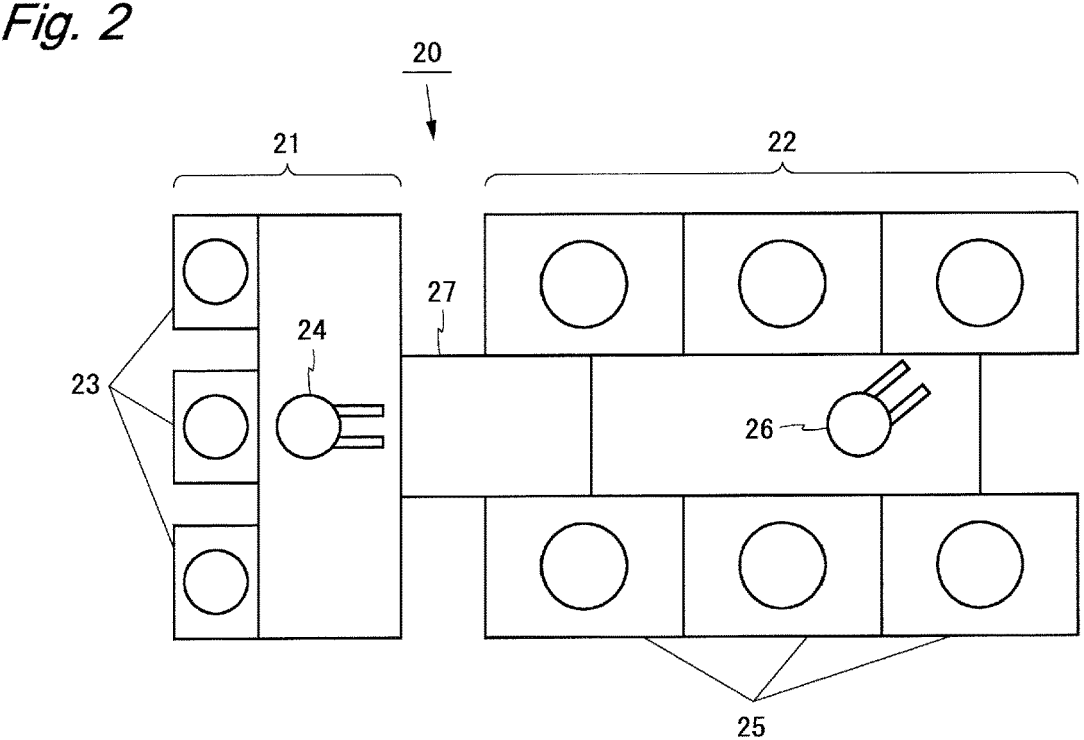
FIG. 2 is a diagram showing a schematic configuration of a substrate processing apparatus shown in FIG. 1.

FIG. 2 is a diagram showing a schematic configuration of the substrate processing apparatus 20. The substrate processing apparatus 20 includes an indexer section 21 and a processing section 22. The indexer section 21 includes a plurality of cassette holding sections 23 and an indexer robot 24. The processing section 22 includes a plurality of processing units 25 and a substrate transfer robot 26. A cassette (not shown) including a plurality of substrates is set to the cassette holding section 23. The indexer robot 24 performs an operation for taking out a substrate from the cassette and an operation for putting the substrate into the cassette. The processing unit 25 has rooms (hereinafter referred to as chambers) for performing processing on the substrate. The chamber corresponds one to one with the processing unit 25. For example, processing of cleaning the substrate using processing liquid is performed in the chamber. The substrate transfer robot 26 performs an operation for carrying the substrate in the processing unit 25 and an operation for carrying the substrate out of the processing unit 25. The number of the processing units 25 is twenty-four, for example. In this case, for example, tower structures each including four stacked processing units 25 are provided at six positions around the substrate transfer robot 26.

The indexer robot 24 takes out a processing-target substrate from the cassette set to the cassette holding section 23, and passes the taken-out substrate to the substrate transfer robot 26 via a substrate receiving/transferring section 27. The substrate transfer robot 26 carries the substrate received from the indexer robot 24 in a target processing unit 25. After the processing on the substrate is completed, the substrate transfer robot 26 takes out the substrate from the target processing unit 25, and passes the taken-out substrate to the indexer robot 24 via the substrate receiving/transferring section 27. The indexer robot 24 puts the substrate received from the substrate transfer robot 26 into a target cassette. Control of the indexer section 21 and the processing section 22 is performed by a control section (not shown) of the substrate processing apparatus 20.

Figure 3:
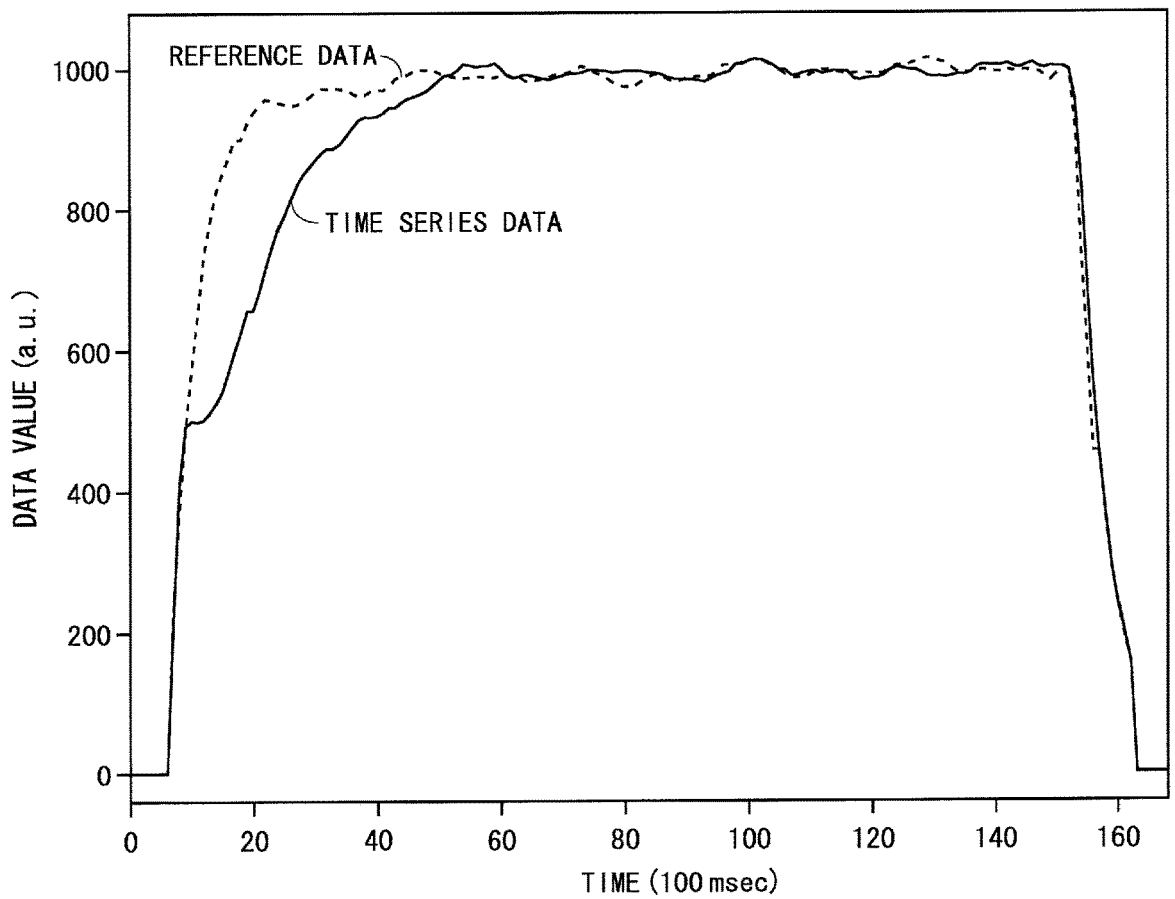
FIG. 3 is a diagram showing a graph of time series data in the data processing device shown in FIG. 1.

Hereinafter, processing performed by the processing unit 25 on one substrate is referred to as a "unit processing". During execution of the unit processing, a plurality of physical quantities is measured in the processing unit 25 using sensors or the like. A plurality of pieces of time series data 7 is obtained based on measurement results of the plurality of physical quantities. The obtained plurality of pieces of time series data 7 is stored in the data storage section 11. When the time series data 7 is shown in a graph form, a graph shown in FIG. 3 as a solid line is obtained, for example. When corresponding reference data 8 is shown in a graph form, a graph shown in FIG. 3 as a broken line is obtained, for example. In an example shown in FIG. 3, the time series data 7 is behind the reference data 8 when rising.

Figure 4:
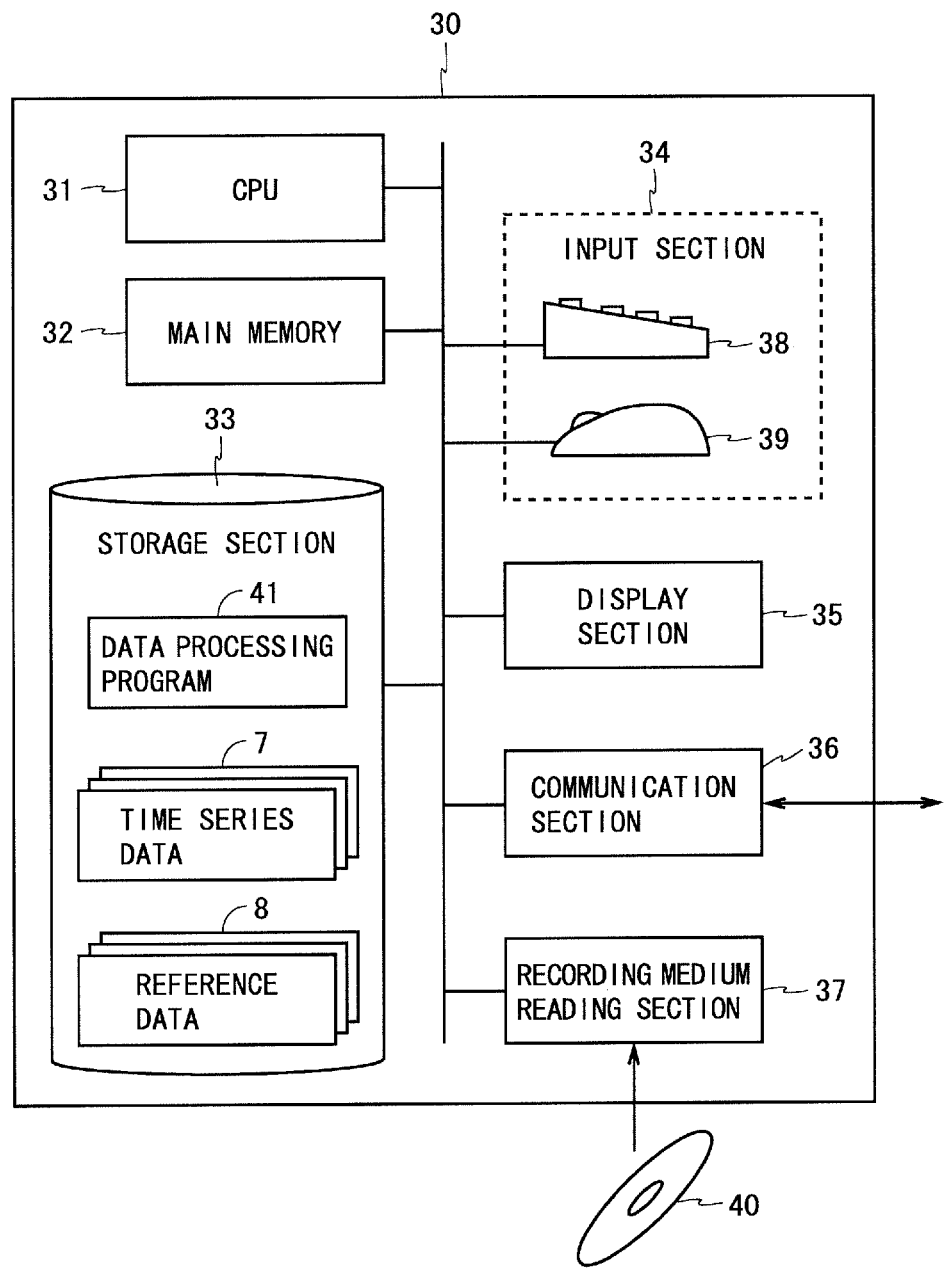
FIG. 4 is a block diagram showing a configuration example of a computer functioning as the data processing device shown in FIG. 1.

FIG. 4 is a block diagram showing a configuration example of a computer functioning as the data processing device 10. A computer 30 shown in FIG. 4 includes a CPU 31, a main memory 32, a storage section 33, an input section 34, a display section 35, a communication section 36, and a recording medium reading section 37. A DRAM is used for the main memory 32, for example. A hard disk is used for the storage section 33, for example. A keyboard 38 and a mouse 39 are included in the input section 34, for example. A liquid crystal display is used for the display section 35, for example. The communication section 36 is an interface circuit of cable communication or wireless communication. Communication with the substrate processing apparatus 20 or other data processing devices is performed using the communication section 36. The recording medium reading section 37 is an interface circuit of a recording medium 40 having recorded thereon a program and the like. A non-transitory recording medium, such as a CD-ROM, is used for the recording medium 40, for example. Note that the configuration of the computer 30 described above is only an example, and the data processing device 10 can be configured using arbitrary computers.

In the following, a case in which the computer 30 functions as the data processing device 10 is described. In this case, the storage section 33 stores a data processing program 41, the time series data 7, and the reference data 8. The time series data 7 is received from the substrate processing apparatus 20 using the communication section 36. For example, the data processing program 41 and the reference data 8 may be received from a server or another computer using the communication section 36, or may be read out from the recording medium 40 using the recording medium reading section 37. The reference data 8 may be selected from the time series data 7 stored in the storage section 33, by the user using the input section 34. When the data processing program 41 is to be executed, the data processing program 41, the time series data 7, and the reference data 8 are copied and transferred to the main memory 32. The CPU 31 performs processing for obtaining the score 9 of the time series data 7, processing for selecting the score 9 with respect to the substrate satisfying a given condition, processing for displaying the evaluation result screen based on the selected score 9, and the like, by executing the data processing program 41 stored in the main memory 32 using the main memory 32 as a work memory. At this time, the computer 30 functions as the data processing device 10.

Figure 5:
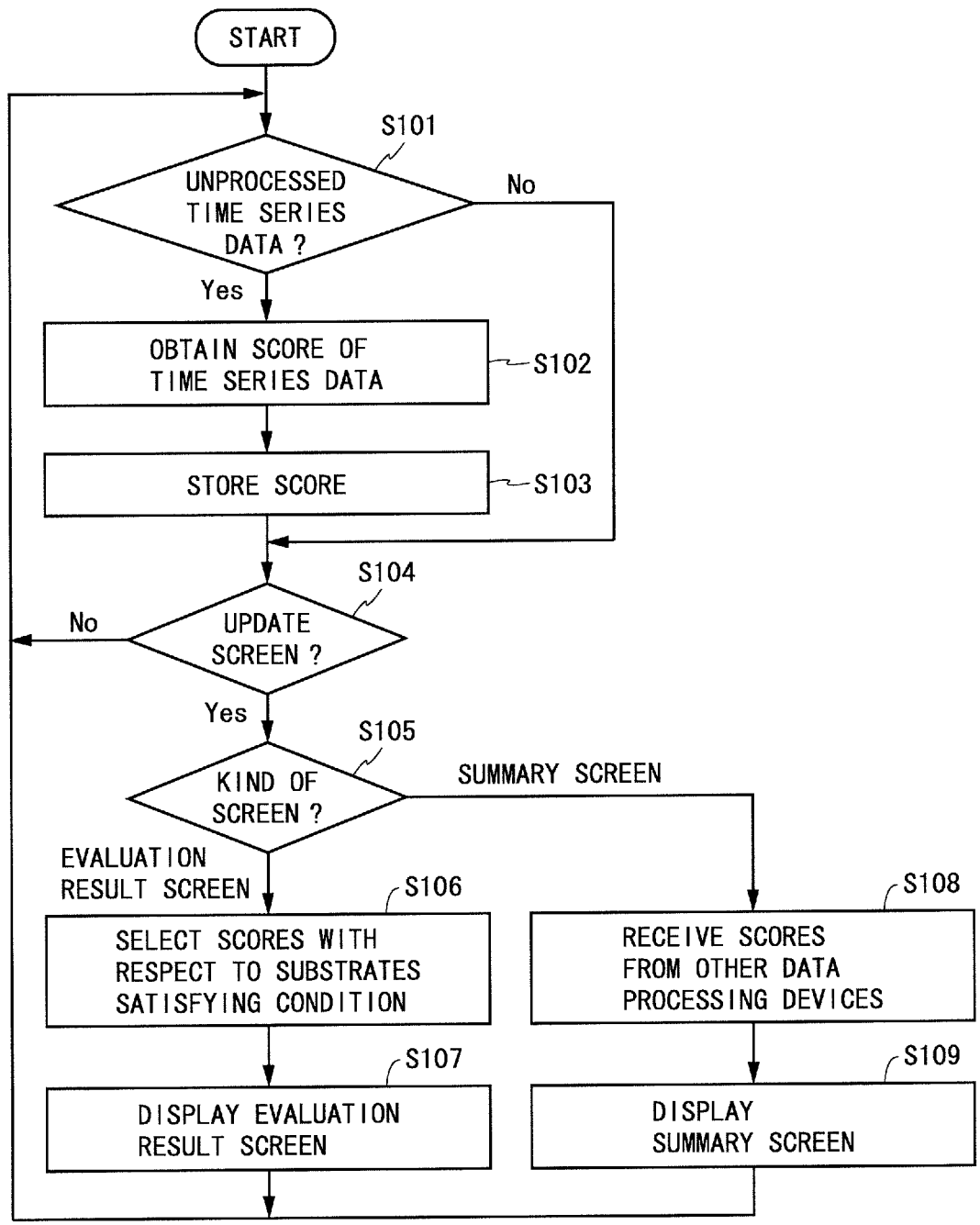
FIG. 5 is a flowchart showing an operation of the data processing device shown in FIG. 1.

FIG. 5 is a flowchart showing an operation of the data processing device 10. Before the data processing device 10 starts the operation, the time series data 7 and the reference data 8 are stored in the data storage section 11. The data processing device 10 repeatedly executes steps S101 to S109 shown in FIG. 5.

As shown in FIG. 5, the score calculation section 12 determines whether unprocessed time series data 7 exists, goes to step S102 if Yes, and goes to step S104 if No (step S101). In the former case, the score calculation section 12 obtains the score 9 of the unprocessed time series data 7 (step S102). In step S102, the score calculation section 12 obtains the score 9 by comparing each time series data 7 with corresponding reference data 8. Next, the score storage section 13 stores the score 9 obtained in step S102 (step S103).

Next, the result display section 15 determines whether to update a screen, goes to step S105 if Yes, and goes to step S101 if No (step S104). In step S104, the result display section 15 determines to update the screen when the score storage section 13 stores a new score 9, when the user inputs an instruction, or the like.

If Yes in step S104, the result display section 15 determines whether a kind of the screen to be displayed is an evaluation result screen or a summary screen, goes to step S106 in the former case, and goes to step S108 in the latter case (step S105). In the former case, the filter section 14 selects the scores 9 with respect to the substrates satisfying a given condition from the scores 9 stored in the score storage section 13 (step S106). Next, the result display section 15 displays the evaluation result screen based on the scores 9 selected in step S106 (step S107).

If the summary screen is determined in step S105, the data processing device 10 receives scores obtained by other data processing devices from the other data processing devices (step S108). Next, the result display section 15 displays the summary screen based on the scores 9 obtained in the score calculation section 12 and the scores received in step S108 (step S109). After executing step S107 or S109, control of the data processing device 10 goes to step S101.

In the flowchart shown in FIG. 5, step S102 executed by the score calculation section 12 corresponds to an evaluation value calculation step. Step S106 executed by the filter section 14 corresponds to an evaluation value selection step. Steps S107 and S109 executed by the result display section 15 correspond to a result display step.

When the substrate processing apparatus 20 performs one unit processing, a plurality of pieces of time series data 7 is obtained. The score calculation section 12 obtains the score 9 with respect to each time series data 7 for each substrate. The score calculation section 12 has a threshold value for each score 9. The score calculation section 12 determines the substrate of which any of the plurality of scores 9 exceeds the threshold value as a "substrate with respect to which a score error occurs", and determines the substrate of which none of the plurality of scores 9 exceeds the threshold value as a "substrate with respect to which no score errors occur". Hereinafter, the number of substrates processed by the processing unit 25 is referred to as a "number of processing", and the number of substrates with respect to which the score error occurs is referred to as a "number of score errors".

Figure 6:
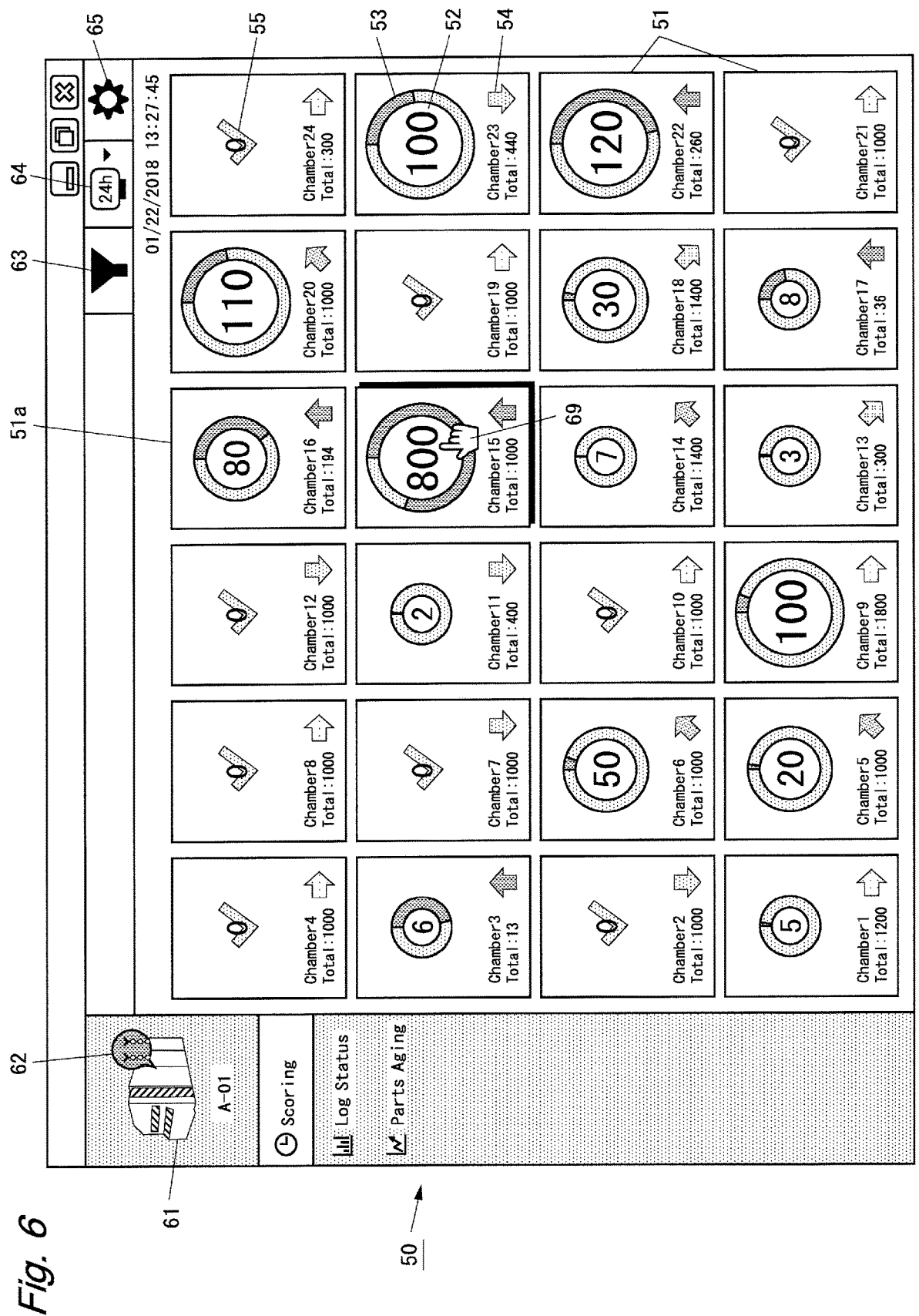
FIG. 6 is a diagram showing an evaluation result screen of the data processing device shown in FIG. 1.

FIG. 6 is a diagram showing the evaluation result screen displayed by the result display section 15. An evaluation result screen 50 shown in FIG. 6 has a plurality of display areas 51 corresponding to the plurality of processing units 25. The plurality of display areas 51 is arranged two-dimensionally in the evaluation result screen 50. A number of score errors 52 and the like are displayed in each display area 51. An outline view 61 and an identifier of the substrate processing apparatus 20 and the like are displayed in a left-side portion of the evaluation result screen 50. When a substrate with respect to which the score error occurs is detected, a face mark 62 is displayed so as to overlap with the outline view 61. Icons 63 to 65 are displayed in an upper-side portion of the evaluation result screen 50, and a mouse cursor 69 is further displayed in the evaluation result screen 50. Note that the evaluation result screen 50 shown in FIG. 6 is a screen for explanation when the number of score errors is large. An actual number of score errors is smaller than values shown in FIG. 6.

In the following, a case in which the substrate processing apparatus 20 has twenty-four processing units 25 is described. The evaluation result screen 50 has twenty-four display areas 51 corresponding to the twenty-four processing units 25. In each display area 51, "Chamber N" shows that a serial number of the chamber of the processing unit 25 is N. "Total:X" shows that the number of processing is X. The number of score errors 52, a pie chart 53, and an arrow 54 are displayed in the display area 51. However, when the number of score errors is zero, a check mark 55 is displayed in replace of the pie chart 53.

When the number of score errors is not smaller than one, the pie chart 53 is displayed in the display area 51, and the number of score errors 52 is displayed inside the pie chart 53. A display size of the number of score errors and that of the pie chart 53 change in three steps depending on the number of score errors. The display size of the number of score errors 52 and that of the pie chart 53 become minimum size when the number of score errors is smaller than 10, become middle size when the number of score errors is not smaller than 10 and smaller than 100, and become maximum size when the number of score errors is not smaller than 100.

The pie chart 53 shows a ratio of the number of score errors to the number of processing. A first element (deep-colored portion) of the pie chart 53 shows the number of score errors. A second element (remaining portion) of the pie chart 53 shows the number of substrates with respect to which no score errors occur. For example, when the number of processing in a sixteenth processing unit 25 is 194 and the number of score errors in that is 80, the display size of the number of score errors 52 and that of the pie chart 53 in a display area 51a become middle size. In the pie chart 53 in the display area 51a, 80/194 of the whole become the first element, and 114/194 of the whole become the second element. When the number of score errors is zero, the check mark 55 is displayed in the display area 51, and a number 0 is displayed in a position overlapping with the check mark 55.

Note that although the evaluation result screen 50 is expressed using white, black, and patterns in FIG. 6 for the sake of convenience of description of the drawings, the evaluation result screen 50 is displayed in fact using a plurality of colors. For example, the first element of the pie chart 53 is displayed in red, and the second element of the pie chart 53 and the check mark 55 are displayed in green.

In addition to the function for displaying the evaluation result screen 50 including the number of score errors 52 and the pie chart 53, the data processing device 10 has a period filter function, a function for displaying a trend of increase and decrease of the score errors, a push notification function of the score error, a recipe filter function, a hierarchical display function, a chamber grouping function, and a summary screen display function. In the following, these functions will be described in order.

Figure 7:
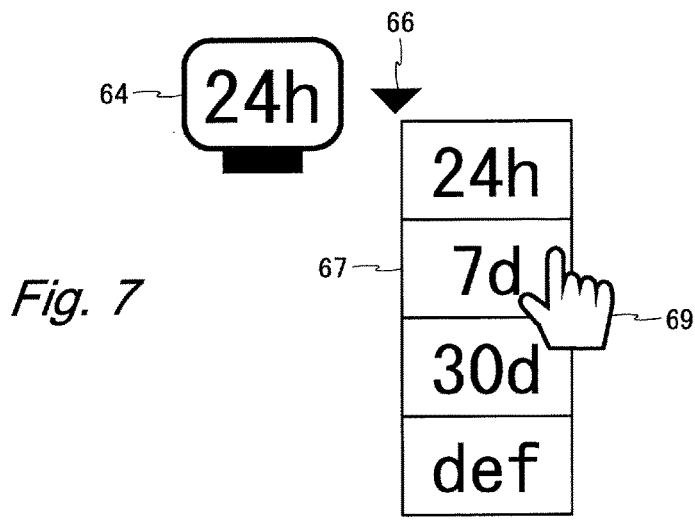
FIG. 7 is a diagram showing a part of the evaluation result screen shown in FIG. 6 in an enlarged manner.

First, the period filter function is described. FIG. 7 is a diagram showing a part of the evaluation result screen 50 in an enlarged manner. As shown in FIG. 7, a triangle mark 66 is displayed on a right side of the icon 64. When the user operates the mouse 39 and selects the triangle mark 66, a pull-down menu 67 is displayed. Each item in the pull-down menu 67 shows a length of a score evaluation period. Items "24 h", "7 d", and "30 d" show 24 hours, seven days, and 30 days, respectively. An item "def" shows that the length of the score evaluation period is to be specified by the user. When the user selects the item "def", a screen (not shown) for inputting the length of the score evaluation period is displayed. The user inputs a start time and the length of the score evaluation period to the displayed screen. Note that the user may input the start time (or start day and time) and an end time (or end day and time) in place of the start time and the length of the score evaluation period.

The filter section 14 selects the scores with respect to the substrates on which processing is completed in the score evaluation period, from the scores 9 stored in the score storage section 13. The result display section 15 displays the evaluation result screen 50 based on the scores selected by the filter section 14. At this time, the result display section 15 displays the evaluation result screen 50 including, for each processing unit 25, the number of the substrates on which processing is completed in the score evaluation period and with respect to which the score error occurs. For example, when the length of the score evaluation period is 24 hours, the number of the substrates on which processing is completed in 24 hours before the present moment and with respect to which the score error occurs is displayed in the display area 51 as the number of score errors 52.

Next, the function for displaying the trend of increase and decrease of the score errors is described. The arrow 54 displayed in the display area 51 shows the trend of increase and decrease of the score errors. In the data processing device 10, a period (hereinafter referred to as a former score evaluation period) having a same length as the score evaluation period is set immediately before the score evaluation period (see FIG. 8). The filter section 14 selects the scores with respect to the substrates on which processing is completed in the score evaluation period and the scores with respect to the substrates on which processing is completed in the former score evaluation period, from the scores 9 stored in the score storage section 13. The result display section 15 obtains, for each processing unit 25, a number of substrates on which processing is completed in the score evaluation period and with respect to which the score error occurs, and a number of substrates on which processing is completed in the former score evaluation period and with respect to which the score error occurs. For each processing unit 25, the result display section 15 compares two kinds of the numbers, and determines whether the trend of increase and decrease of the score errors is one of "rapid increase", "increase", "no increase and no decrease", "decrease", and "rapid decrease". Threshold values for the determination are set arbitrarily in advance by the user.

Figure 8:
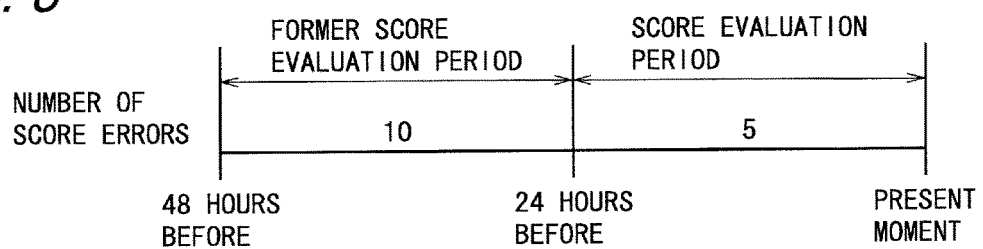
FIG. 8 is a diagram showing a score evaluation period in the data processing device shown in FIG. 1.

In an example shown in FIG. 8, a start time of the score evaluation period is the present moment and the length of the score evaluation period is 24 hours. In this case, a period from the present moment to 24 hours before becomes the score evaluation period, and a period from 24 hours before to 48 hours before becomes the former score evaluation period. When the number of substrates on which processing is completed in the score evaluation period and with respect to which the score error occurs is five, and the number of substrates on which processing is completed in the former score evaluation period and with respect to which the score error occurs is ten, the result display section 15 determines that the trend of increase and decrease of the score errors is "decrease".

Figure 9:
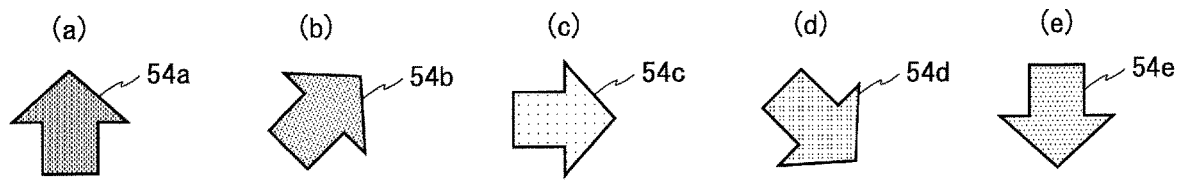
FIG. 9 is a diagram showing kinds of arrows included in the evaluation result screen shown in FIG. 6.

FIG. 9 is a diagram showing kinds of the arrow 54. When the trend of increase and decrease of the score errors is "rapid increase", an upward arrow 54a shown in FIG. 9(a) is displayed, for example in red. When the trend of increase and decrease of the score errors is "increase", a diagonally upward arrow 54b shown in FIG. 9(b) is displayed, for example in orange. When the trend of increase and decrease of the score errors is "no increase and no decrease", a rightward arrow 54c shown in FIG. 9(c) is displayed, for example in gray. When the trend of increase and decrease of the score errors is "decrease", a diagonally downward arrow 54d shown in FIG. 9(d) is displayed, for example in light green. When the trend of increase and decrease of the score errors is "rapid decrease", a downward arrow 54e shown in FIG. 9(e) is displayed, for example in green.

Next, the push notification function of the score error is described. The face mark 62 is not displayed until the substrate with respect to which the score error occurs is detected. When the substrate with respect to which the score error occurs is detected, the face mark 62 is displayed automatically even if the user does not perform any operation. When the user operates the mouse 39 and inputs a score error confirm instruction, the face mark 62 disappears from the evaluation result screen 50. An expression of the face mark 62 changes depending on a number of substrates of which score is abnormal and on which processing is completed after a confirmation by the user (hereinafter referred to as a "number of score errors after confirmation").

Figure 10:
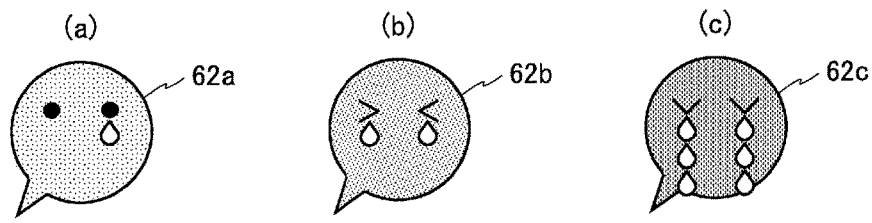
FIG. 10 is a diagram showing kinds of face marks included in the evaluation result screen shown in FIG. 6.

FIG. 10 is a diagram showing kinds of the face mark 62. When the number of score errors after confirmation is not smaller than one and not larger than four, a face mark 62a shown in FIG. 10(a) is displayed. The face mark 62a has an expression having a teardrop in a left eye and is displayed, for example in yellow. When the number of score errors after confirmation is not smaller than five and not larger than nine, a face mark 62b shown in FIG. 10(b) is displayed. The face mark 62b has an expression having a teardrop in each of two eyes and is displayed, for example in orange. When the number of score errors after confirmation is not smaller than 10, a face mark 62c shown in FIG. 10(c) is displayed. The face mark 62c has an expression having three teardrops in each of the two eyes and is displayed, for example in red. Threshold values for switching the kind of the face mark 62 are set arbitrarily in advance by the user.

When the user operates the mouse 39 and selects the face mark 62, a score error list screen 71 shown in FIG. 11 is displayed in an overlapping manner on the evaluation result screen 50. An identifier, status, occurring date and time, and content of the score error are displayed in each row of the score error list screen 71. If the score error has been confirmed by the user, a check mark is displayed in a field of the status. If the score error has not been confirmed by the user, a check box 72 is displayed in the field of the status.

When the user operates the mouse 39 and selects a score error included in the score error list screen 71, another screen (not shown) showing details of the score error is displayed in an overlapping manner on the score error list screen 71. After looking at the displayed screen and recognizing the content of the score error, the user operates the mouse 39 to make a check in the check box 72 and pushes an OK button. With this, the user inputs the confirmation instruction with respect to the selected score error.

The user inputs the confirmation instructions with respect to all score errors, for example before leaving a seat. At this time, the face mark 62 disappears from the evaluation result screen 50. When a substrate with respect to which the score error occurs is detected while the user leaves the seat, the face mark 62 having an expression depending on the number of the substrates with respect to which the score error occurs is displayed in the evaluation result screen 50. When the user returns to the seat, the user looks at the face mark 62 and knows a degree to which the substrates with respect to which the score error occurs are detected while the user leaves the seat. Furthermore, the user knows the content of the score error detected while the user leaves the seat, by selecting the face mark 62 and looking at the score error list screen 71.

Next, the recipe filter function is described. When the user operates the mouse 39 and selects the icon 63, a recipe list screen 75 shown in FIG. 12 is displayed in an overlapping manner on the evaluation result screen 50. An identifier, a selection state, last update date and time, and content of the recipe are displayed in each row of the recipe list screen 75. A check box 76 is displayed in a field of the selection state. The user inputs a recipe selection instruction by operating the mouse 39 and making a check in the check box 76.

The filter section 14 selects the scores 9 with respect to the substrate processed in accordance with the selected recipe, from the scores 9 stored in the score storage section 13. The result display section 15 displays the evaluation result screen 50 based on the scores 9 selected by the filter section 14. At this time, the evaluation result screen 50 based on the scores 9 with respect to the substrates processed according to the selected recipe is displayed.

Figure 13C:
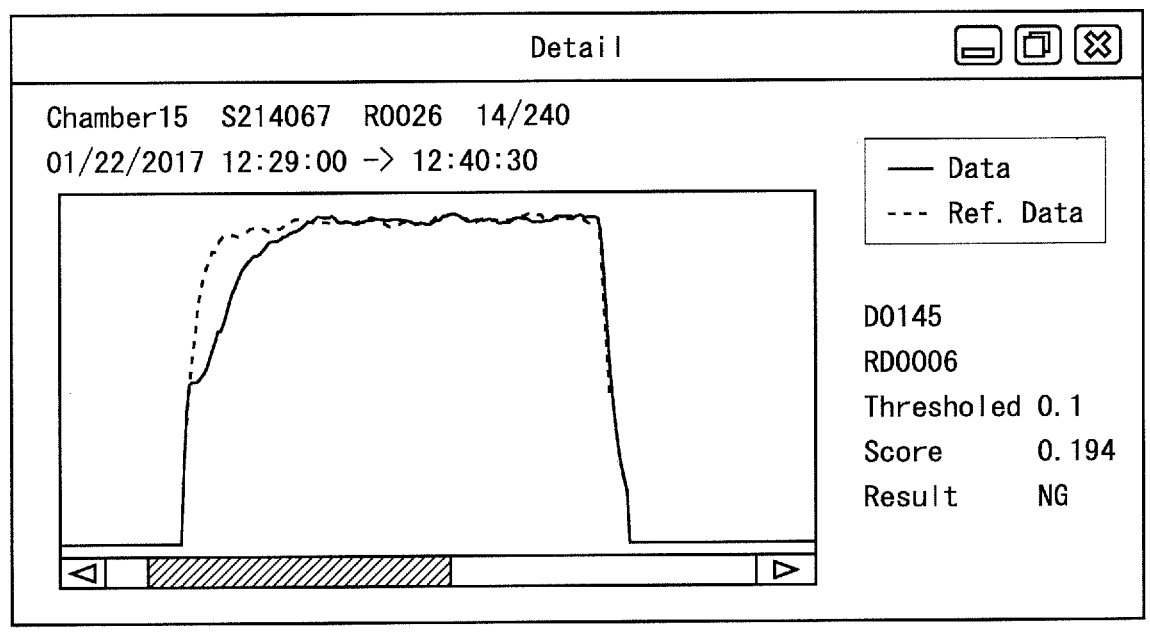
FIG. 13C is a diagram showing a detailed screen of the data processing device shown in FIG. 1.

Next, the hierarchical display function is described. FIG. 13A to FIG. 13C are diagrams showing screens displayed in an overlapping manner on the evaluation result screen 50. Note that although contents of the screens are displayed as new dialogs in FIGS. 13A to 13C respectively, the contents of the screens may be displayed as tabs in one dialog displayed in an overlapping manner on the evaluation result screen 50, and the content of the screen to be displayed may be switchable by pressing a tab button. The method for displaying as the tabs has advantages that a plurality of screens can be displayed side by side in one dialog, that the plurality of screens can be switched easily, and the like. If the user operates the mouse 39 and selects a fifteenth processing unit 25 (display area 51 described as Chamber 15) in the evaluation result screen 50 shown in FIG. 6, a result list screen 81 shown in FIG. 13A is displayed. An identifier of the substrate, the identifier of the recipe, a number of abnormal scores and a number of all scores, and a start time and an end time of processing are displayed in each row of the result list screen 81.

Note that in the embodiment of the present invention, not limited to the above, when the display area 51 described as Chamber 15 shown in FIG. 6 is selected, a scoring set list screen (not shown) in which conditions (for example, a period in which the substrate is processed, a kind of recipe, and the like) used for filtering the scores to be displayed are arranged in a list form is displayed, and when a predetermined condition is selected from the list, the result list screen 81 shown in FIG. 13A may be displayed as a score corresponding to the condition.

When the user operates the mouse 39 and selects a substrate "S214067" in the result list screen 81, a score list screen 82 shown in FIG. 13B is displayed. An identifier of the time series data, an identifier of the reference data, a determination criterion, a determination result, and the score are displayed in each row of the score list screen 82. The determination criterion is a standard used when comparing the time series data with the reference data and determining whether normal or abnormal. For example, a standard "Threshold 0.1" shows that it is determined as normal when the score is not larger than 0.1. In a field of the determination result, "OK" is displayed when the score is normal and "NG" is displayed when the score is abnormal.

When the user operates the mouse 39 and selects time series data "D0146" in the score list screen 82, a detailed screen 83 shown in FIG. 13C is displayed. The detailed screen 83 includes a graph of the time series data 7 and the reference data 8. In this manner, the result display section 15 hierarchically displays the evaluation result screen 50, the score list screen 82 including the score (evaluation value), and the detailed screen 83 including the graph of the time series data 7.

Figure 14:
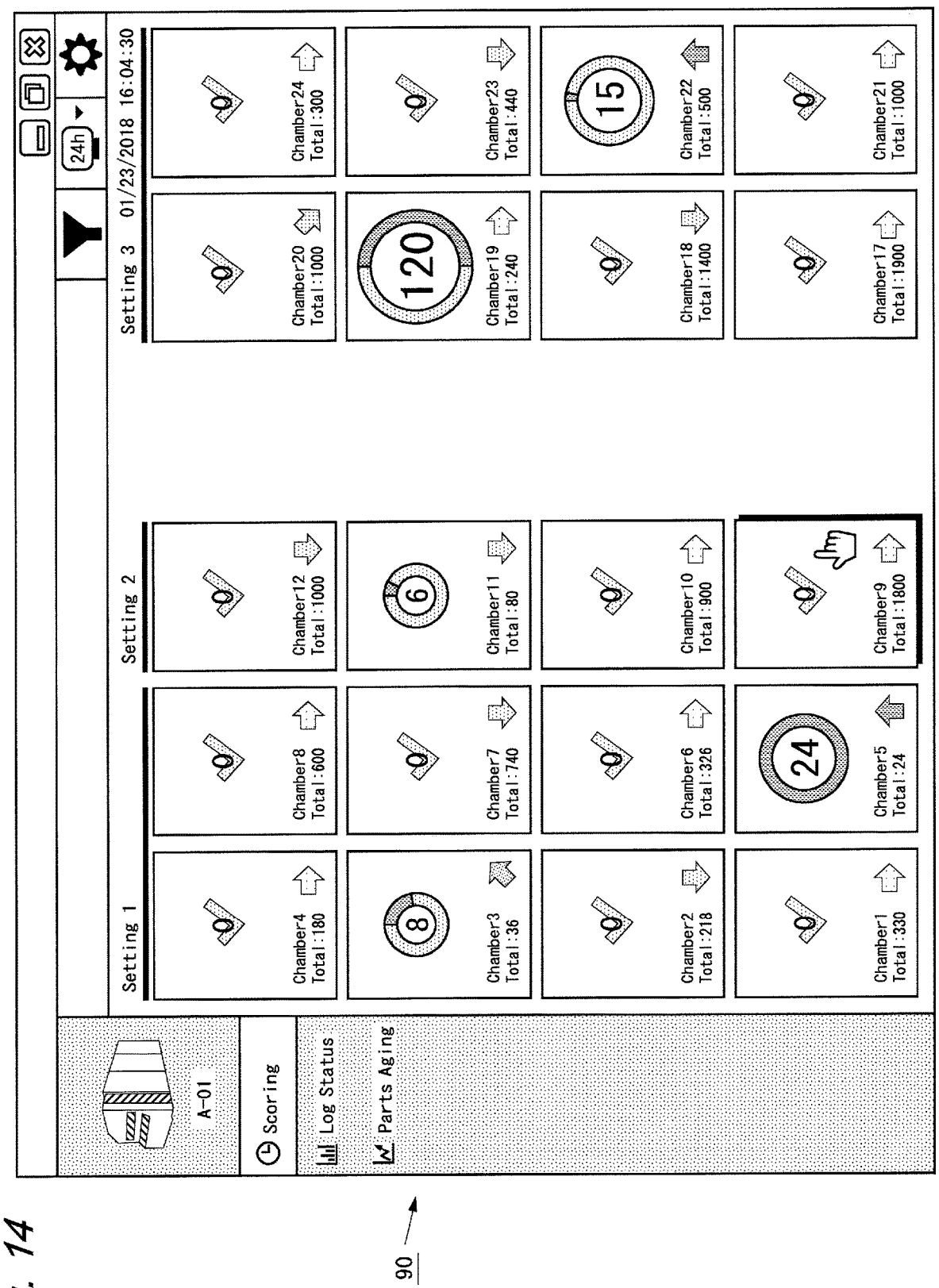
FIG. 14 is a diagram showing the evaluation result screen when a chamber grouping is performed in the data processing device shown in FIG. 1.

Next, the chamber grouping function is described. FIG. 14 is a diagram showing the evaluation result screen when a chamber grouping is performed. The processing units 25 are classified into three groups in an evaluation result screen 90 shown in FIG. 14. First to eighth processing units are classified as a first group, ninth to twelfth processing units 25 are classified as a second group, and seventeenth to twenty-fourth processing units 25 are classified as a third group. The processing units 25 in the first group perform first processing on the substrate. The processing units 25 in the second group perform, on the substrate, second processing which is different from the first processing. The processing units 25 in the third group perform, on the substrate, third processing which is different from the first and second processing. Note that as a classification method into groups, various kinds of classification methods, for example, a classification based on a used reference data or a classification based on a period in which the substrate is processed may be used other than the classification based on the processing on the substrate.

The filter section 14 selects the scores 9 with respect to the substrates on which different processing is performed for each group of the processing units 25, from the scores 9 stored in the score storage section 13. The result display section 15 displays the evaluation result screen 90 based on the scores 9 with respect to the substrates on which different processing is performed for each group of the processing units 25. Thus, in the display area 51 corresponding to the processing units 25 in the first group, display is performed based on the scores of the substrates on which the first processing is performed, in the display area 51 corresponding to the processing units 25 in the second group, display is performed based on the scores of the substrates on which the second processing is performed, and in the display area 51 corresponding to the processing units 25 in the third group, display is performed based on the scores of the substrates on which the third processing is performed.

Figure 15:
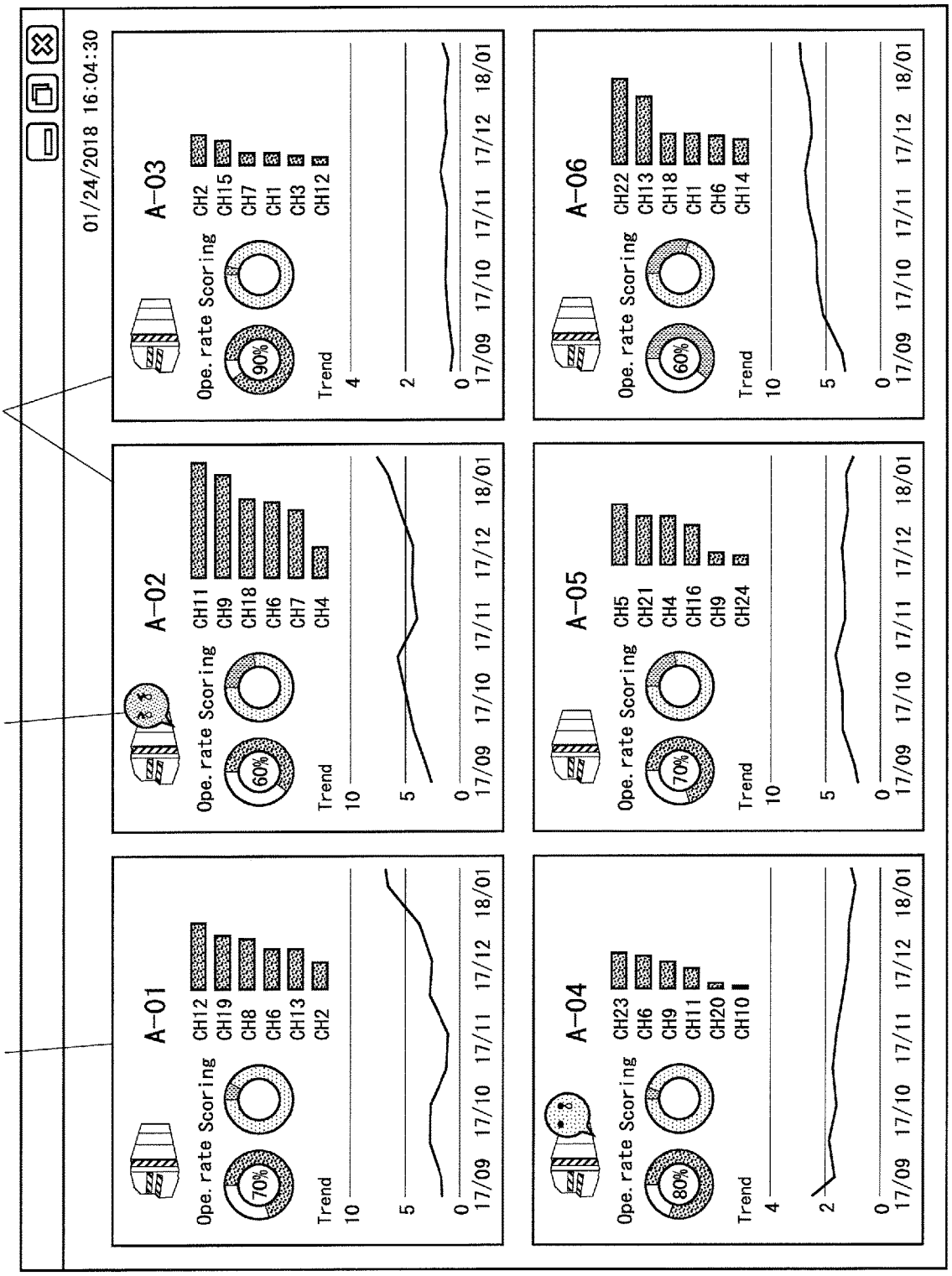
FIG. 15 is a diagram showing a summary screen of the data processing device shown in FIG. 1.

Next, the summary screen display function is described. FIG. 15 is a diagram showing the summary screen displayed in step S109 shown in FIG. 5. A summary screen 95 shown in FIG. 15 has six display areas 96. An upper-left display area 96a shows operating status of the substrate processing apparatus connected to the data processing device 10. In the display area 96a, display is performed based on the scores obtained in the score calculation section 12. Other five display areas 96 show operating status of other substrate processing apparatuses which are not connected to the data processing device 10. In these display areas 96, display is performed based on the scores obtained in the other data processing devices.

An outline view and an identifier of the substrate processing apparatus, a pie chart showing an operating ratio, a pie chart showing an occurrence ratio of the score errors, a bar graph showing an occurrence situation of the score errors in each processing unit, and a line graph showing temporal variation of the occurrence situation of the score errors are displayed in each display area 96. Furthermore, when the substrate with respect to which the score error occurs is detected, a face mark 97 is displayed so as to overlap with the outline view of the substrate processing apparatus.

In order to process the time series data 7 obtained in the substrate processing apparatus 20 having the plurality of processing units 25, the data processing method according to the present embodiment includes an evaluation value calculation step (S102) of obtaining an evaluation value (score) of the time series data 7 by comparing the time series data 7 with the reference data 8, and a result display step (S107) of displaying the evaluation result screen 50 including, for each processing unit 25, the pie chart 53 showing a ratio of the number of abnormalities (number of score errors 52) to a number of processed substrates, the number of abnormalities being a number of substrates of which evaluation value is abnormal. The display size of the pie chart 53 changes depending on the number of abnormalities. Thus, the evaluation result screen 50 including, for each processing unit 25, the pie chart 53 showing the ratio of the number of abnormalities is displayed, and the display size of the pie chart 53 changes depending on the number of abnormalities. Therefore, when the user looks at the evaluation result screen 50, based on the displayed pie chart 53, the user can easily grasp status of the plurality of processing units 25 included in the substrate processing apparatus 20 and can easily recognize the processing unit 25 having high urgency in the plurality of processing units 25.

The evaluation result screen 50 includes the number of abnormalities inside the pie chart 53. Thus, the status of the plurality of processing units 25 can be displayed in a small area. The display size of the number of abnormalities changes depending on the number of abnormalities. Therefore, when the user looks at the evaluation result screen 50, based on the displayed number of abnormalities, the user can easily grasp the status of the plurality of processing units 25 included in the substrate processing apparatus 20 and can easily recognize the processing unit 25 having high urgency in the plurality of processing units 25. The evaluation result screen 50 further includes, for each processing unit 25, the arrow 54 showing the trend of increase and decrease of the number of abnormalities. Therefore, the user can easily recognize the trend of increase and decrease of the number of abnormalities in each processing unit 25, by looking at the arrow 54. The evaluation result screen 50 further includes the face mark 62, and the expression of the face mark 62 changes depending on the number of substrates of which evaluation value is abnormal and on which processing is completed after a confirmation by the user. Therefore, the user can easily recognize a degree to which substrates of which the evaluation value is abnormal are detected recently, by looking at the face mark 62.

The data processing method according to the present embodiment further includes an evaluation value selection step (S106) of selecting the evaluation values with respect to the substrates satisfying a given condition from the evaluation values obtained in the evaluation value calculation step, and in the result display step, the evaluation result screen 50 is displayed based on the evaluation values selected in the evaluation value selection step. Therefore, the user can easily grasp the status of the processing unit 25 when the substrate is processed in accordance with a specific procedure. In the evaluation value selection step, the evaluation value with respect to the substrate on which different processing is performed for each group of the processing units 25 is selected, and in the result display step, the evaluation result screen 90 is displayed based on the evaluation values with respect to the substrate on which different processing is performed for each group of the processing units 25 (chamber grouping function). Therefore, the user can easily recognize the status of the processing units 25 when different processing is performed on the substrate for each group.

In the result display step, the evaluation result screen 50, the score list screen 82 including the evaluation value, and the detailed screen 83 including the graph of the time series data 7 are displayed hierarchically. Therefore, the user can easily analyze the evaluation value and the time series data 7 with respect to the substrates of which evaluation value is abnormal. In the result display step, the summary screen 95 based on the evaluation value obtained in the evaluation value calculation step and the evaluation value obtained in another data processing device is displayed. Therefore, when the user looks at the summary screen 95, the user can easily grasp status of a plurality of substrate processing apparatuses. An evaluation value suitable for the time series data 7 can be obtained by using another time series data as the reference data 8.

The data processing device 10 and the data processing program 41 according to the present embodiment have features similar to those of the above-described data processing method, and attain similar effects. According to the data processing method, the data processing device 10, and the data processing program 41 according to the present embodiment, the user can easily grasp the status of the plurality of processing units 25 included in the substrate processing apparatus 20, and can easily recognize the processing unit 25 having high urgency in the plurality of processing units.

Note that in the above-described data processing method, the evaluation result screen 50 includes the number of score errors 52, the pie chart 53, the arrow 54, and the face mark 62. However, the evaluation result screen 50 does not necessarily have to include all of the number of score errors 52, the pie chart 53, the arrow 54, and the face mark 62. Furthermore, the data processing method according to the present embodiment has the period filter function, the function for displaying the trend of increase and decrease of the score errors, the push notification function of the score error, the recipe filter function, the hierarchical display function, the chamber grouping function, and the summary screen display function. A data processing method according to a modification does not necessarily have to have the above-described processing at all, and may have only processing arbitrarily selected from the above-described processing. The same holds true for the data processing device and the data processing program according to a modification.

Although the present invention is described in detail in the above, the above description is exemplary in all of the aspects and is not restrictive. It is understood that various other changes and modifications can be derived without going out of the present invention.

This application claims a priority based on Japanese Patent Application No. 2018-20795 filed on Feb. 8, 2018, and entitled "Data Processing Method, Data Processing Device, And Data Processing Program", which is incorporated herein by reference in its entirety.

What is claimed is:

1. A data processing method for processing time series data obtained from sensors in a substrate processing apparatus having a plurality of processing units, the method comprising:
    obtaining, with a computer, an evaluation value of the time series data by comparing the time series data with reference data;
    displaying with a computer monitor an evaluation result screen including, for each processing unit, a pie chart showing a ratio of a number of abnormalities to a number of processed substrates, the number of abnormalities being a number of abnormal substrates, wherein an abnormal substrate is determined when an evaluation value of a substrate exceeds a threshold value, and
    changing, with the computer, a display size of the pie chart based on the number of abnormalities, wherein
    the evaluation result screen includes the number of abnormalities inside the pie chart,
    a display size of the number of abnormalities is larger as the number of abnormalities is larger, and
    the evaluation result screen further includes a face mark,
    the face mark is displayed automatically when the abnormal substrate is detected after a confirmation by a user,
    an expression of the face mark changes depending on a number of substrates for which an evaluation value is abnormal and on which processing is completed after the confirmation by the user, wherein the expression of the face mark is a facial expression,
    an error list screen including content of each error in an error list is displayed when the face mark is selected by the user, and
    the face mark disappears from the evaluation result screen when the user inputs an error confirm instruction.

2. The data processing method according to claim 1, wherein the evaluation result screen further includes, for each processing unit, an arrow showing a trend of increase or decrease of a number of abnormalities.

3. The data processing method according to claim 1, further comprising selecting an evaluation value with respect to a substrate satisfying a given condition from evaluation values, wherein
    the evaluation result screen is displayed based on the selected evaluation value.

4. The data processing method according to claim 3, wherein
    the evaluation value with respect to the substrate on which different processing is performed for each group of the processing units is selected, and
    the evaluation result screen is displayed based on the evaluation value with respect to the substrate on which different processing is performed for each group of the processing units, so that display positions corresponding to the processing units are gathered for each group.

5. The data processing method according to claim 1, wherein the evaluation result screen, a screen including the evaluation value of the time series data, and a screen including a graph of the time series data are displayed hierarchically.

6. The data processing method according to claim 1, wherein a summary screen based on the evaluation value of the time series data and an evaluation value obtained in another data processing device is displayed.

7. The data processing method according to claim 1, wherein the reference data is another time series data.

8. A data processing device for processing time series data obtained from sensors in a substrate processing apparatus having a plurality of processing units, the device comprising:
- a computer configured to obtain an evaluation value of the time series data by comparing the time series data with reference data; and
- a computer monitor that is operatively connected to the computer to display an evaluation result screen including, for each processing unit, a pie chart showing a ratio of a number of abnormalities to a number of processed substrates, the number of abnormalities being a number of abnormal substrates, wherein an abnormal substrate is determined when an evaluation value of a substrate exceeds a threshold value, wherein
- the computer is configured to change a display size of the pie chart based on the number of abnormalities,
- the evaluation result screen includes the number of abnormalities inside the pie chart,
- a display size of the number of abnormalities is larger as the number of abnormalities is larger, and
- the evaluation result screen further includes a face mark,
- the face mark is displayed automatically when the abnormal substrate is detected after a confirmation by a user,
- an expression of the face mark changes depending on a number of substrates for which an evaluation value is abnormal and on which processing is completed after the confirmation by the user, wherein the expression of the face mark is a facial expression,
- an error list screen including content of each error in an error list is displayed when the face mark is selected by the user, and
- the face mark disappears from the evaluation result screen when the user inputs an error confirm instruction.

9. The data processing device according to claim 8, wherein the evaluation result screen further includes, for each processing unit, an arrow showing a trend of increase or decrease of a number of abnormalities.

10. The data processing device according to claim 8, wherein the computer is further configured to select an evaluation value with respect to a substrate satisfying a given condition from evaluation values, wherein
- the computer monitor displays the evaluation result screen based on the evaluation value selected by the computer.

11. The data processing device according to claim 10, wherein
- the computer is configured to select the evaluation value with respect to the substrate on which different processing is performed for each group of the processing units, and
- the computer monitor displays the evaluation result screen based on the evaluation value with respect to the substrate on which different processing is performed for each group of the processing units, so that display positions corresponding to the processing units are gathered for each group.

12. The data processing device according to claim 8, wherein the computer monitor hierarchically displays the evaluation result screen, a screen including the evaluation value of the time series data, and a screen including a graph of the time series data.

13. The data processing device according to claim 8, wherein the computer monitor displays a summary screen based on the evaluation value of the time series data and an evaluation value obtained in another data processing device.

14. A non-transitory computer-readable recording medium having recorded thereon a data processing program for processing time series data obtained from sensors in a substrate processing apparatus including a plurality of processing units, the data processing program causing a computer to execute a method by a CPU using a memory, the method comprising:
- obtaining an evaluation value of the time series data by comparing the time series data with reference data;
- displaying with a computer monitor an evaluation result screen including, for each processing unit, a pie chart showing a ratio of a number of abnormalities to a number of processed substrates, the number of abnormalities being a number of abnormal substrates, wherein an abnormal substrate is determined when an evaluation value of a substrate exceeds a threshold value, and
- changing a display size of the pie chart based on the number of abnormalities, wherein
- the evaluation result screen includes the number of abnormalities inside the pie chart,
- a display size of the number of abnormalities is larger as the number of abnormalities is larger, and
- the evaluation result screen further includes a face mark,
- the face mark is displayed automatically when the abnormal substrate is detected after a confirmation by a user,
- an expression of the face mark changes depending on a number of substrates for which an evaluation value is abnormal and on which processing is completed after the confirmation by the user, wherein the expression of the face mark is a facial expression,
- an error list screen including content of each error in an error list is displayed when the face mark is selected by the user, and
- the face mark disappears from the evaluation result screen when the user inputs an error confirm instruction.

* * * * *